United States Patent [19]

Smith et al.

[11] 4,081,064
[45] Mar. 28, 1978

[54] DRIVE CONNECTION FOR THE PRESSURE PLATE OF A FRICTION CLUTCH

[75] Inventors: Grant H. Smith, Rockford; John C. Hayter, Rockton, both of Ill.

[73] Assignee: Borg-Warner Corporation, Chicago, Ill.

[21] Appl. No.: 722,924

[22] Filed: Sep. 13, 1976

[51] Int. Cl.² ............................................ F16D 13/50
[52] U.S. Cl. .................. 192/70.13; 64/15 C; 64/23.5; 64/27 C; 192/70.17; 192/70.2; 192/70.28
[58] Field of Search ............ 192/70.13, 70.17, 70.18, 192/70.19, 70.2, 70.28; 188/218 XL, 73.5; 64/15 C, 23, 23.5, 27 C

[56] References Cited

U.S. PATENT DOCUMENTS

| 708,455 | 9/1902 | Blake | 64/27 C |
|---|---|---|---|
| 1,225,754 | 5/1917 | Blanditi | 64/15 C |
| 2,633,217 | 3/1953 | Carlson | 192/66 |
| 2,718,293 | 9/1955 | Palm | 192/93 |
| 3,191,735 | 6/1965 | Wavak | 192/70.2 X |
| 3,305,060 | 2/1967 | Zeidler | 192/70.19 |
| 3,548,984 | 12/1970 | Root | 192/70.17 |
| 3,605,967 | 9/1971 | Warren et al. | 188/218 XL X |

FOREIGN PATENT DOCUMENTS

| 685,851 | 5/1964 | Canada | 192/70.19 |
|---|---|---|---|
| 2,608,348 | 1/1976 | Germany | 192/70.2 |

*Primary Examiner*—Allan D. Herrmann
*Attorney, Agent, or Firm*—Herman E. Smith

[57] ABSTRACT

An improved drive connection for a pressure plate of a friction clutch includes replaceable wear shoes especially adapted for retention in position so as to avoid the imposition of damaging stresses, thereon, including a barrier wall for deflecting air currents from the interface of the wear shoe with the housing, and further includes a damper spring which exerts a resilient bias between a pressure plate and housing both tangentially and parallel with respect to the axis of the clutch.

3 Claims, 4 Drawing Figures

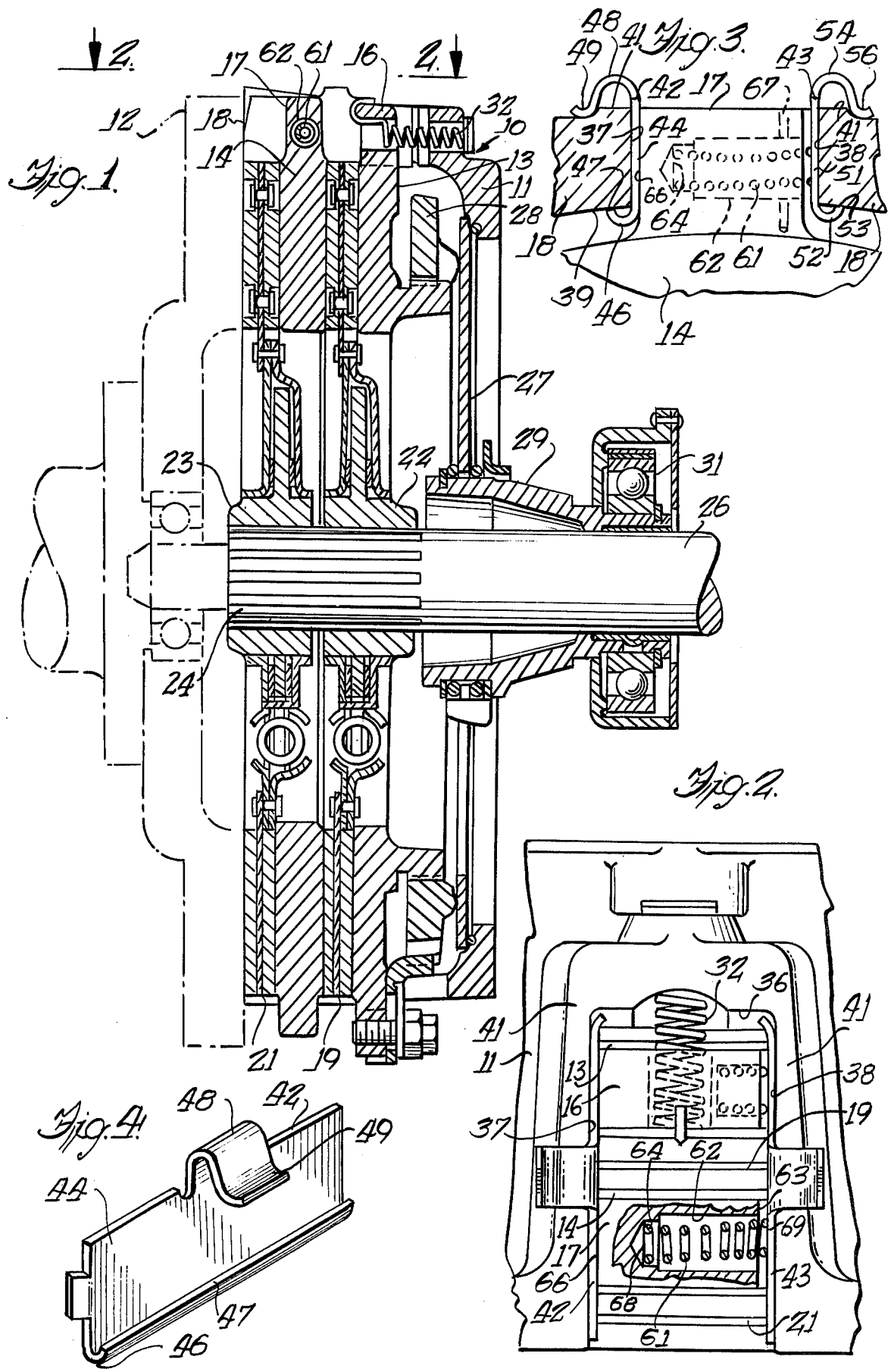

DRIVE CONNECTION FOR THE PRESSURE PLATE OF A FRICTION CLUTCH

BACKGROUND OF THE INVENTION

1. Field

The present invention relates generally to friction clutches and more particularly to an improved drive connection for the pressure plate of a friction clutch.

2. Prior Art

In friction clutches it is known to provide a drive connection for a pressure plate by means of a slot in a peripheral wall of the clutch housing which engages a radially extending drive lug on the pressure plate. Such a drive connection imparts rotary motion to the pressure plate while permitting axial movement of the plate with respect to the housing. In practice it has been found that oscillation of the pressure plate with respect to the housing results in pounding of the drive lug against the walls of the slot which in turn damages the surface of the slot such that smooth sliding motion of the lug in the slot is inhibited.

One approach to the solution of the above problem has been to select materials for the housing and pressure plate based upon surface hardness properties of the materials. This approach is subject to objection in that it limits the materials available for manufacture of the housing. The installation of inserts into the slots has been known to result in destruction of the insert. It is believed that the destruction of earlier forms of inserts is due in part to the occurrence of high velocity air currents in the clutch which displace the insert to a position in which it is subject to destructive pounding by the drive lug.

SUMMARY OF THE INVENTION

The present invention is directed to an improved drive connection for the pressure plate of a friction clutch. It is a principal object of the invention to provide for substantially unimpeded axial movement of the drive lug of a pressure plate in a cooperating slot in the clutch housing. To this end, the invention provides a damper spring acting between the drive lug and housing arranged for exerting a resilient bias on the drive lug both in a direction tangential and parallel with respect to the axis of rotation of the clutch. In addition, the invention provides a novel form of wear insert so formed as to eliminate stress concentration zones and formed to minimize displacement due to high velocity air currents in the clutch. The use of a spring steel wear shoe or shoes in the drive connection permits the use of a ferrous metal pressure plate in combination with a non-ferrous housing.

BRIEF DESCRIPTION OF THE DRAWING

FIG. 1 is a section view of a friction clutch including an improved drive connection according to the present invention;

FIG. 2 is a fragmentary view to enlarged scale taken along the line 2—2 of FIG. 1;

FIG. 3 is a fragmentary plan view of the drive connection of the present invention; and FIG. 4 is a perspective view of a wear shoe employed in the drive connection.

DESCRIPTION OF THE PREFERRED EMBODIMENT

Referring now in more detail to the drawing, a friction clutch 10 includes a rotatable housing 11 arranged for rotation by means of a flywheel 12 of an engine. A primary pressure plate 13 and an intermediate pressure plate 14 are disposed within housing 11 and include respective radially extending drive lugs 16 and 17 engaging a slotted portion of a peripheral wall 18 of the housing by which means rotary motion is imparted to the pressure plates. A pair of friction plates 19 and 21 is included in the clutch, friction plate 19 being disposed between primary pressure plate 13 and intermediate pressure plate 14, while friction plate 21 is disposed between intermediate pressure plate 14 and the flywheel 12. The friction plates 19 and 21 are provided with hubs 22, 23 engaging a splined portion 24 of an output shaft 26. A belleville spring 27 bears against a portion of housing 11 and a fulcrum ring 28 mounted on primary pressure plate 13. The belleville spring 27 acts to urge the pressure plates, friction plates and flywheel into frictional torque transfer engagement with each other by which means rotation of the housing is imparted to the output shaft. An axially moveable release sleeve 29 and throw out bearing assembly 31 are arranged concentrically about output shaft 26. Release sleeve 29 is connected to inner portions of belleville spring 27 such that movement of the sleeve to the right as viewed in FIG. 1 is effective to pull the spring away from fulcrum ring 28 thereby releasing the pressure plates and friction plates for permitting relative rotation between housing 11 and output shaft 26. Upon release of the clutch engaging force, the retractor spring 32 pulls primary pressure plate 13 axially away from friction plate 19. The improved drive connection as shown more clearly in FIGS. 2–4 facilitates axial movement of intermediate pressure plate 14 for separation from friction plates 19 and 21.

The slotted portion 36 of housing 11 is defined, in part, by a pair of substantially flat spaced planar side walls 37, 38 extending through a peripheral wall 18 from an inner surface 39 to an outer surface 41. A pair of wear shoes 42, 43 are inserted in slotted portion 36. Wear shoe 42 includes a flat, planar base portion 44 which extends outwardly beyond outer surface 41 and inwardly beyond inner surface 39. It is preferred that the planar base portion 44 of the wear shoe slightly exceed the flat surface of its respective side wall in order to assure flat surface to surface contact between the wear shoe and side wall, recognizing that slight misalinement of the wear shoe and peripheral wall may be expected to occur. Wear shoe 42 includes a U-shaped inner clip portion 46 extending laterally from and merging into base portion 44 and terminating in an edge 47 engaging inner surface 39 of wall 18. The edge 47 provides a spacer for assuring that the flat base portion 44 of the wear shoe is correctly positioned with respect to the side wall 37. The U-shaped inner clip portion 46 provides an uninterrupted barrier wall coextensive with base portion 44 arranged for deflecting air currents from the interface of side wall 37 with base portion 44. The intrusion of air currents between the slot wall and wear shoe tends to dislodge the wear shoe such that contact with a drive lug may result in damage or destruction of the wear shoe. Wear shoe 42 includes an outer clip portion 48 extending laterally with respect to the base portion 44 and defining a resilient spring finger 49 merging into base portion 44.

Wear shoe 43 is similar to wear shoe 42 and includes a flat base portion 51 extending inwardly and outwardly of side wall 38. An inner U-shaped clip portion 52 provides a barrier wall coextensive with the base portion, merging into the base portion and having an edge 53 serving as a spacer for engagement with inner surface 39. An outer clip portion 54 merges into base portion 51 and extends laterally therefrom to provide a finger spring 56. The wear shoes 42, 43 are similar in construction but have the clip portions extending in opposite directions from the base portion in order to form right and left hand members. It is preferred to form the wear shoes of hardened spring steel both to provide a hard surface for the base portion and to provide resilience in the clip portions.

A further feature of the invention resides in the provision of damper spring 61. Drive lug 17 includes a socket or pocket 62 extending tangentially with respect to the axis of rotation of the clutch. Socket 62 opens through lug surface 63 and includes a bottom portion 64 spaced from the opposite lug surface 66. The pocket may be formed with stepped bores, if desired, and is so shown in the drawing. It is preferred that the width of the pocket where it intercepts surface 63 be substantially larger than the diameter of spring 61 at least in a direction parallel to the axis of rotation of the clutch. For convenience, the pocket is formed as a circular bore which provides clearance around spring 61. An aperture 67 intercepts socket 62 through which a pin may be inserted for holding spring 61 in a retracted condition until the assembly of the pressure plate with the housing is completed. After the drive lug 17 is in place in slot portion 36, the keeper pin (not shown in the drawing) is withdrawn from aperture 67 allowing spring 61 to extend such that one end 68 of the spring bears against the bottom 64 of the socket while the distal end 69 of the spring bears against the side of the slot through the wear shoe 43. The damper spring 61 thus is enabled to exert a tangentially directed bias between the drive lug and housing tending to dampen oscillatory pounding movement of the drive lug with respect to the slot walls. In addition, the clearance in the socket permits axial displacement of the distal end 69 of the spring with respect to spring end 68 in response to axial movement of the pressure plate and lug. The axial displacement of the spring ends with respect to each other results in a resilient bias oriented parallel to the axis of the clutch. The resilient bias resulting from axial displacement of the spring ends exerts an axial bias on pressure plate 14 promoting axial movement of lug 17 in slot 36 when the clutch is in disengaged condition.

An improved drive connection for a pressure plate of a friction clutch has been described which permits the use of materials having dissimilar surface hardness properties such as a ferrous pressure plate engaging a nonferrous housing provided with hardened spring steel wear shoes. In addition to protecting the smoothness and integrity of the surfaces of the drive connection, a damper spring is included which dampens pounding of the drive lug in the slot and exerts an axial bias on the pressure plate for assisting axial movement of the drive lug in the slot. In addition, the damper spring is effective to reduce noise caused by contact of the lug with the housing.

What is claimed is:

1. A friction clutch including a rotatable housing and at least one rotatable pressure plate, said housing including a slot in a peripheral wall thereof and said pressure plate including a radially extending drive lug disposed within said slot for imparting rotary driving motion to said pressure plate while permitting axial movement of said pressure plate with respect to said housing, wherein the improvement comprises a replaceable wear shoe disposed within said slot, said wear shoe including a substantially flat base portion in surface to surface contact with a wall of said slot, the flat base portion of said wear shoe extending inwardly and outwardly beyond the surface of said slot wall, said wear shoe including spaced inner and outer clip portions extending laterally with respect to said base portion, each of said inner and outer clip portions merging into said flat base portion, said inner clip portion being formed in a U-shaped configuration defining an edge engageable with an inner surface of said peripheral wall of said housing, said edge of said inner clip portion serving to define a spacer for locating said flat base portion with respect to said wall of said slot.

2. A friction clutch according to claim 1, wherein said inner clip portion of said wear shoe includes an uninterrupted barrier wall substantially coextensive with said base portion and said outer clip portion is in the form of a spring finger arranged and disposed for engaging an outer wall of said housing, said spring finger biasing said edge of said inner clip portion into engagement with said inner surface of said housing.

3. A friction clutch including a rotatable housing and at least one rotatable pressure plate, said housing including a slot in a peripheral wall thereof and said pressure plate including a radially extending drive lug disposed within said slot for imparting rotary driving motion to said pressure plate while permitting axial movement of said pressure plate with respect to said housing, wherein the improvement comprises providing an elongated damper spring disposed within a socket formed in said drive lug extending tangentially with respect to the axis of said clutch, said damper spring having one end thereof bearing against an end of said socket and having a distal end thereof bearing against a side of said slot, said socket being substantially larger than said spring in a direction parallel to the axis of said clutch, said socket permitting sidewise displacement of the ends of said spring with respect to each other in response to axial movement of said pressure plate with respect to said housing, said damper spring exerting a resilient bias between said pressure plate and housing both tangentially and parallel with respect to the axis of rotation of said clutch.

* * * * *